United States Patent
Kawaguchi et al.

(10) Patent No.: US 11,555,661 B2
(45) Date of Patent: Jan. 17, 2023

(54) HEAT EXCHANGING MEMBER AND HEAT EXCHANGER

(71) Applicant: NGK INSULATORS, LTD., Nagoya (JP)

(72) Inventors: Tatsuo Kawaguchi, Nagoya (JP); Daisuke Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 326 days.

(21) Appl. No.: 16/229,644

(22) Filed: Dec. 21, 2018

(65) Prior Publication Data
US 2019/0204031 A1 Jul. 4, 2019

(30) Foreign Application Priority Data

Jan. 4, 2018 (JP) .............................. JP2018-000260

(51) Int. Cl.
*F28F 21/04* (2006.01)
*F28D 7/10* (2006.01)
(Continued)

(52) U.S. Cl.
CPC .............. *F28F 21/04* (2013.01); *F28D 7/106* (2013.01); *F28D 7/163* (2013.01); *F28F 13/06* (2013.01); *F28F 2210/02* (2013.01)

(58) Field of Classification Search
CPC ........ F28F 21/04; F28F 13/06; F28F 2210/02; F28D 7/106; F28D 7/163; F28D 7/103
(Continued)

(56) References Cited

U.S. PATENT DOCUMENTS

| 813,918 A | * | 2/1906 | Schmitz ................. F28D 7/106 165/141 |
| 2,386,746 A | * | 10/1945 | Hess ....................... F24H 3/065 431/258 |

(Continued)

FOREIGN PATENT DOCUMENTS

| CN | 101437600 A | 5/2009 |
| JP | 2008-292017 A | 12/2008 |

(Continued)

OTHER PUBLICATIONS

Chinese Office Action (with English translation) dated Apr. 2, 2022 (Application No. 201811414346.0).

(Continued)

*Primary Examiner* — Tho V Duong
*Assistant Examiner* — Raheena R Malik
(74) *Attorney, Agent, or Firm* — Burr & Brown, PLLC

(57) ABSTRACT

A heat exchanging member includes: a pillar shape honeycomb structure having an outer peripheral wall and partition walls extending through the honeycomb structure from a first end face to a second end face to define a plurality of cells forming a through channel of a first fluid, and a covering member for covering the outer peripheral wall of the honeycomb structure. In a cross section of the honeycomb structure perpendicular to a flow direction of the first fluid, the partition walls includes: a plurality of first partition walls extending in a radial direction from the side of a center portion of the cross section; and a plurality of second partition walls extending in a circumferential direction, and a number of the first partition walls on the side of the central portion is less than a number of the first partition walls on the side of the outer peripheral wall.

9 Claims, 12 Drawing Sheets

(51) Int. Cl.
*F28D 7/16* (2006.01)
*F28F 13/06* (2006.01)

(58) Field of Classification Search
USPC .......................................................... 165/165
See application file for complete search history.

(56) References Cited

U.S. PATENT DOCUMENTS

| | | | | |
|---|---|---|---|---|
| 2,693,026 A * | 11/1954 | Simpelaar | ............. | B21C 37/151 29/890.036 |
| 2,703,921 A * | 3/1955 | Brown, Jr. | ............. | F28D 7/103 29/890.036 |
| 3,803,951 A * | 4/1974 | Bagley | ................. | B29C 48/335 76/107.1 |
| 3,825,063 A * | 7/1974 | Cowans | ................. | F28F 3/086 165/146 |
| 3,828,851 A * | 8/1974 | Takayasu | ................ | F28D 7/103 165/165 |
| 3,837,783 A * | 9/1974 | Bagley | .................... | B29C 48/11 425/464 |
| 4,233,812 A * | 11/1980 | Leistritz | .................... | F01N 1/02 60/320 |
| 4,343,354 A * | 8/1982 | Weber | ....................... | F28F 7/02 165/165 |
| 4,368,777 A * | 1/1983 | Grasso | .................... | F28D 7/106 165/146 |
| 4,373,577 A * | 2/1983 | McMillen | ............. | F28D 1/0358 165/122 |
| 4,657,074 A * | 4/1987 | Tomita | ................... | F24H 3/065 165/179 |
| 4,877,396 A * | 10/1989 | Wunning | ................ | F23L 15/04 431/158 |
| 4,877,670 A * | 10/1989 | Hamanaka | ............... | B01J 21/14 428/116 |
| 4,964,459 A * | 10/1990 | Stenlund | ................ | F28D 7/106 123/41.33 |
| 5,228,513 A * | 7/1993 | Hemsath | .................. | C21D 1/34 165/154 |
| 5,593,646 A * | 1/1997 | Koshiba | .................. | F01N 3/281 422/177 |
| 5,633,066 A * | 5/1997 | Lipp | ........................ | B28B 3/26 428/116 |
| 6,098,704 A * | 8/2000 | Tsuchiya | ................. | B21C 23/10 165/154 |
| 6,157,778 A * | 12/2000 | Kadotani | ................ | F24H 1/142 392/483 |
| 6,374,598 B1 * | 4/2002 | Neuschwander | ....... | F28D 7/106 165/154 |
| 6,419,009 B1 * | 7/2002 | Gregory | .................. | F28D 1/053 165/144 |
| 6,948,555 B1 * | 9/2005 | Garcia | .................. | H01L 23/467 165/80.3 |
| 7,575,793 B2 * | 8/2009 | Aniolek | ............... | B01D 46/247 428/116 |
| 9,534,856 B2 * | 1/2017 | Suzuki | ...................... | F28D 7/10 |
| 10,775,106 B2 * | 9/2020 | Czyz | .......................... | F28F 1/00 |
| 2005/0056408 A1 * | 3/2005 | Gregory | ................... | F28F 9/02 165/151 |
| 2005/0109493 A1 * | 5/2005 | Wu | ......................... | F28D 7/103 165/157 |
| 2007/0012426 A1 * | 1/2007 | Rago | ....................... | F28D 7/106 165/92 |
| 2007/0231533 A1 | 10/2007 | Aniolek et al. | | |
| 2011/0214847 A1 * | 9/2011 | Hur | ............................ | F28F 1/42 165/143 |
| 2012/0199326 A1 * | 8/2012 | Sheldon | .................. | F28D 7/106 165/154 |
| 2015/0292812 A1 * | 10/2015 | Tomita | .................... | F28F 13/12 165/177 |
| 2019/0214847 A1 * | 7/2019 | Tamai | ..................... | H02J 9/062 |

FOREIGN PATENT DOCUMENTS

| | | |
|---|---|---|
| JP | 2009-532605 A | 9/2009 |
| JP | 6075381 B2 | 2/2017 |
| WO | 2014/064812 A | 5/2014 |

OTHER PUBLICATIONS

Japanese Office Action (with English Abstract), Japanese Application No. 2018-246274, dated Oct. 18, 2022 (6 pages).

* cited by examiner

[FIG. 1]
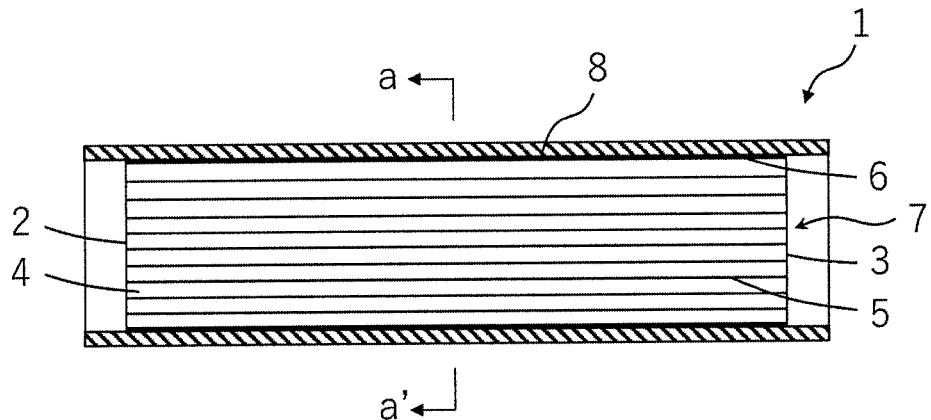
[FIG. 2]
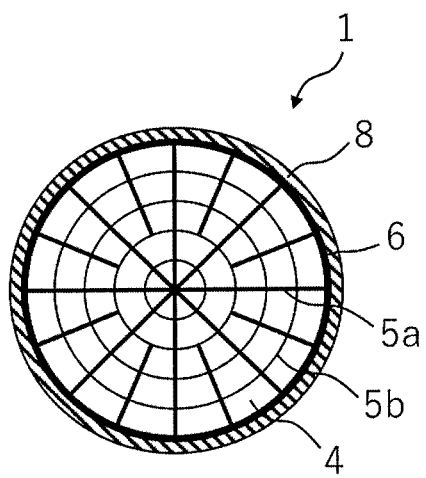
[FIG. 3]
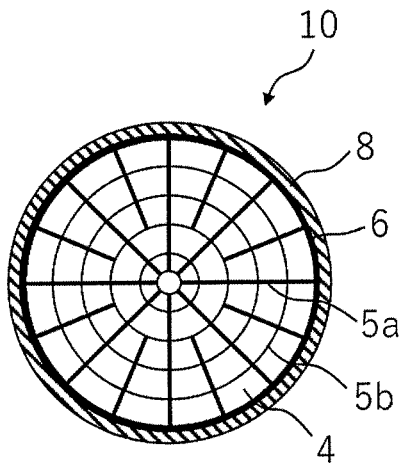

[FIG. 4]
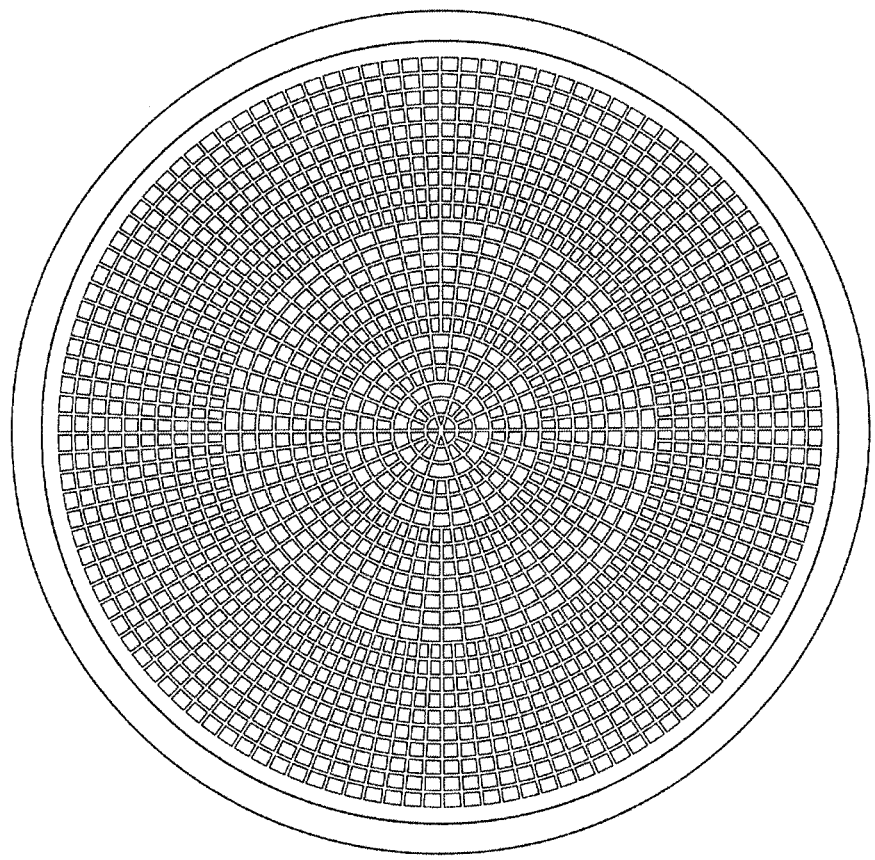

[FIG. 5]
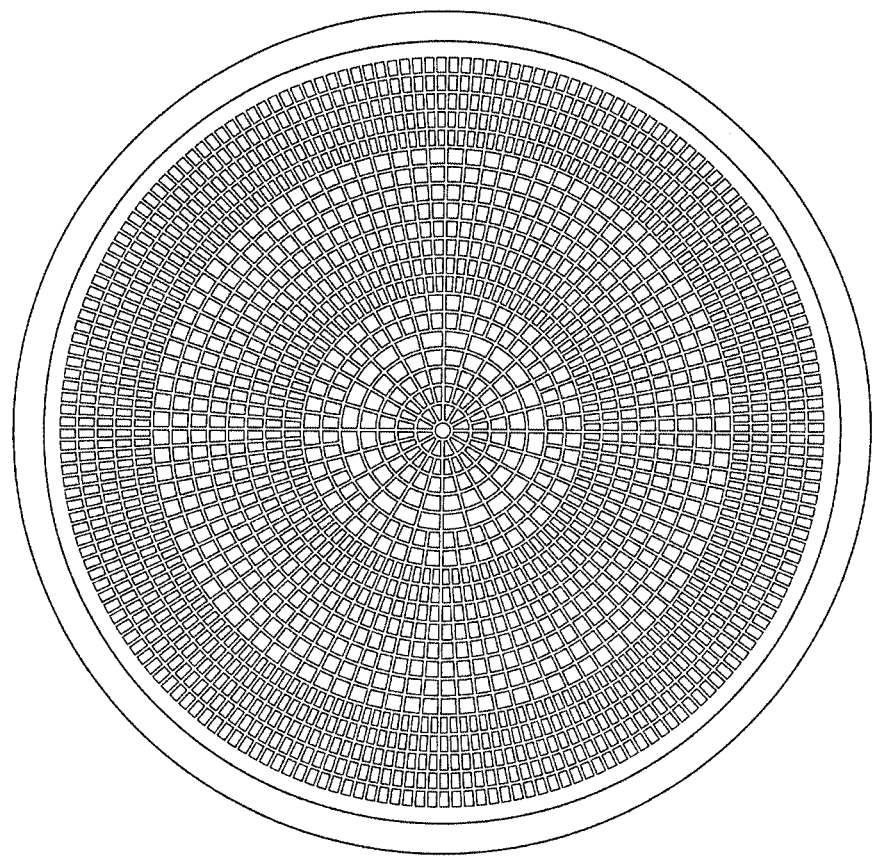

[FIG. 6]
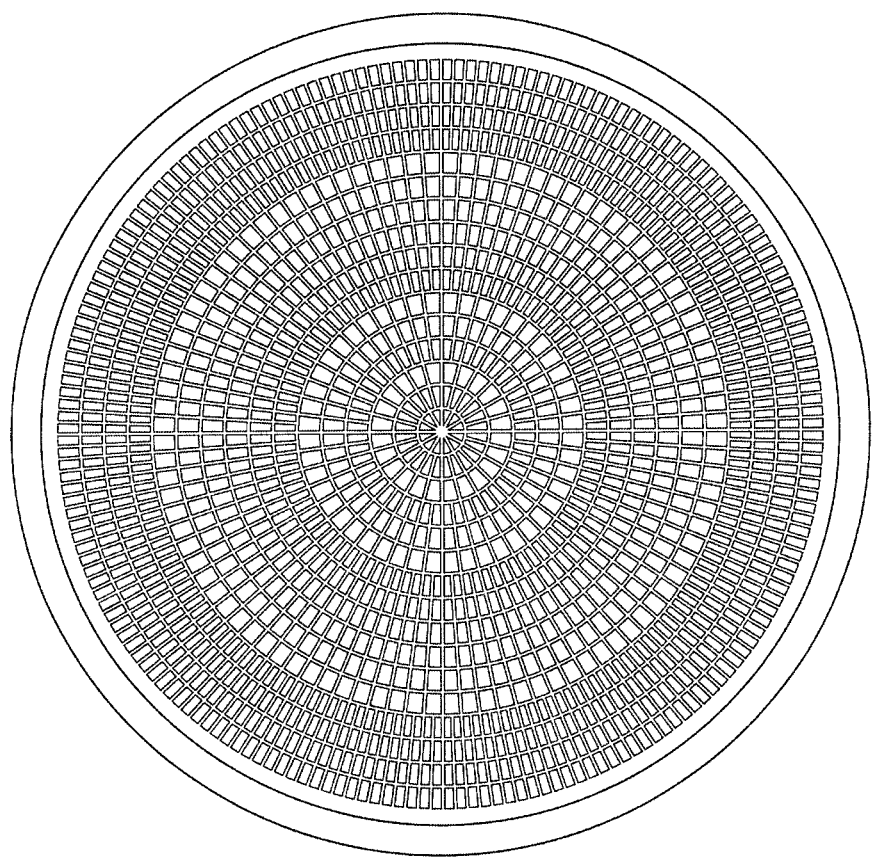

[FIG. 7]
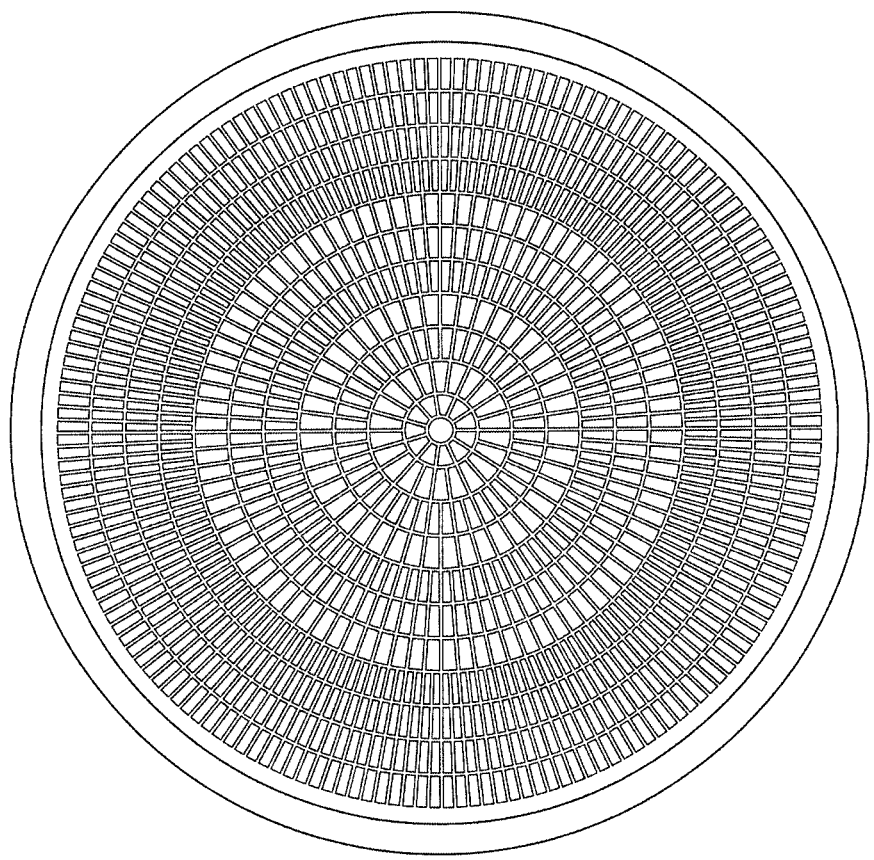

[FIG. 8]
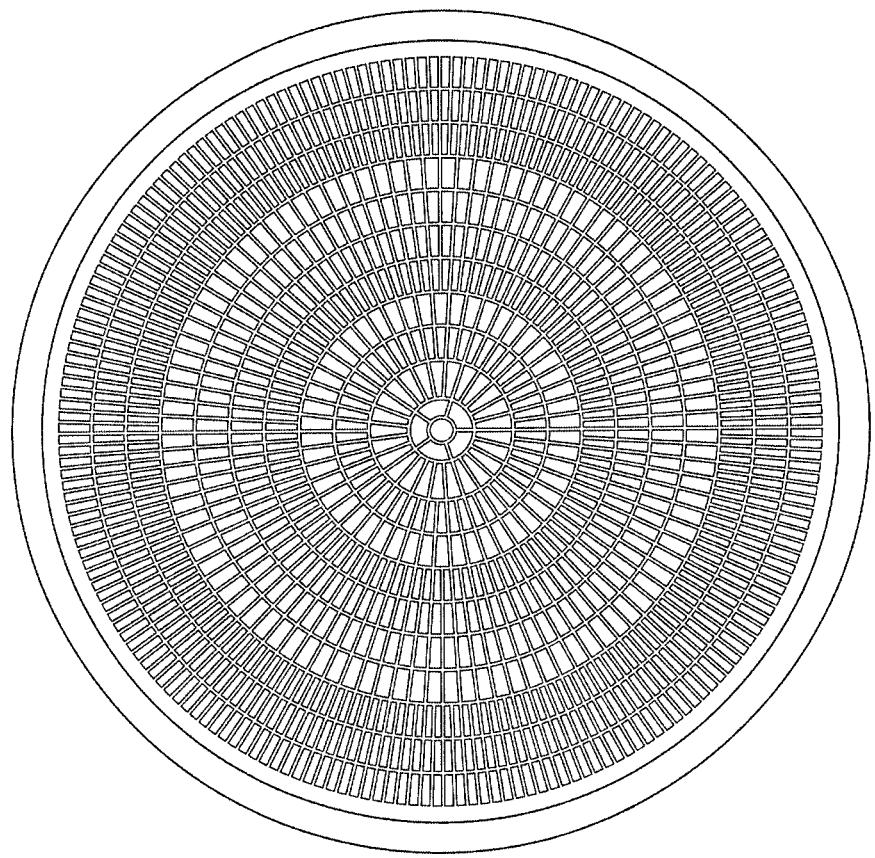

[FIG. 9]
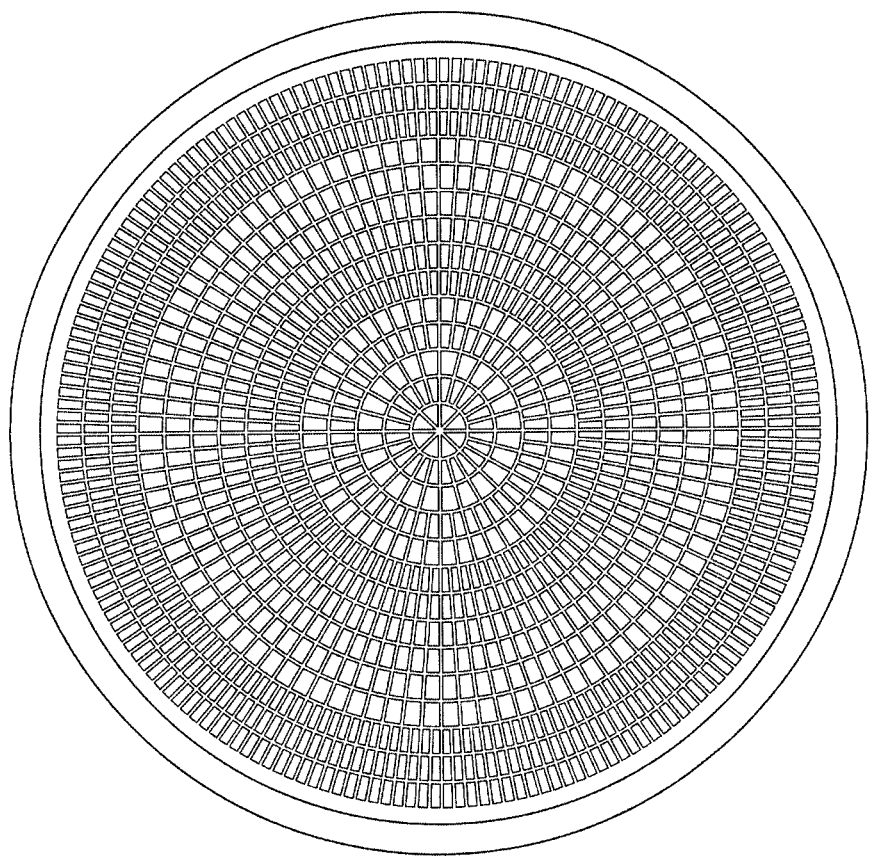

[FIG. 10]
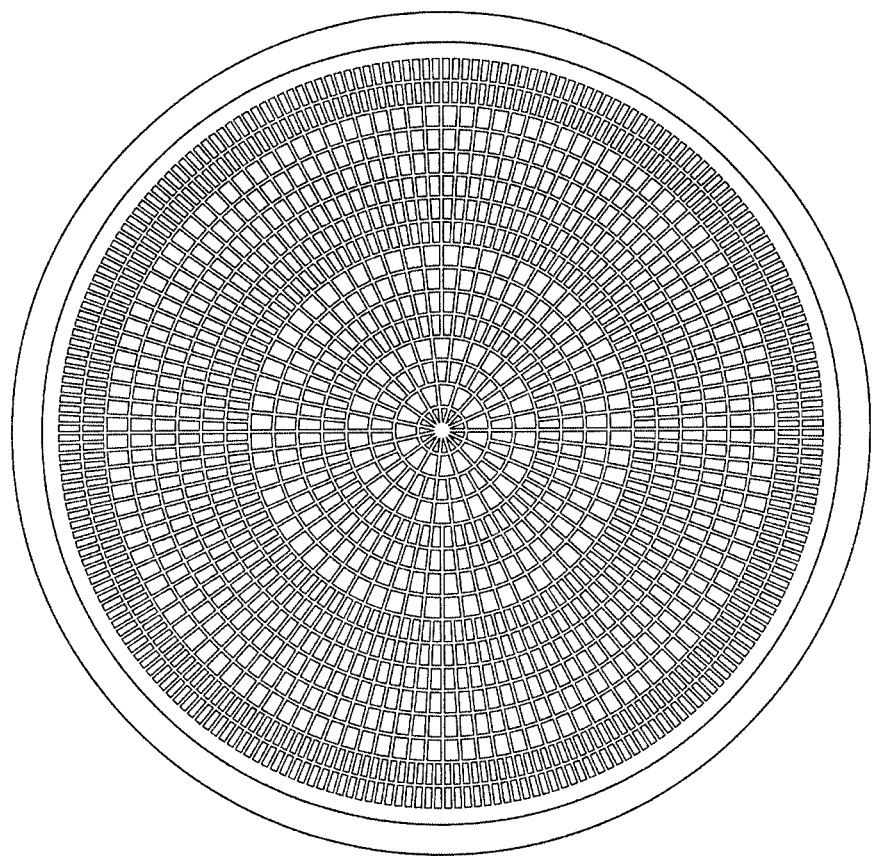

[FIG. 11]
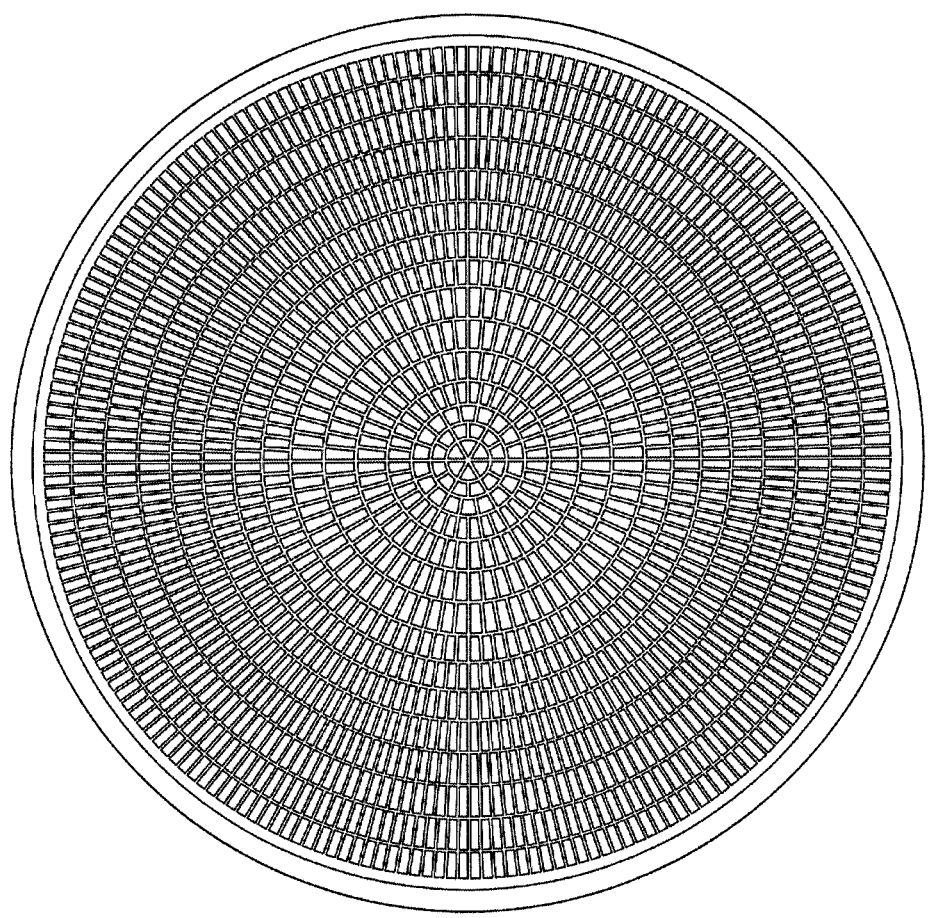

[FIG. 12]
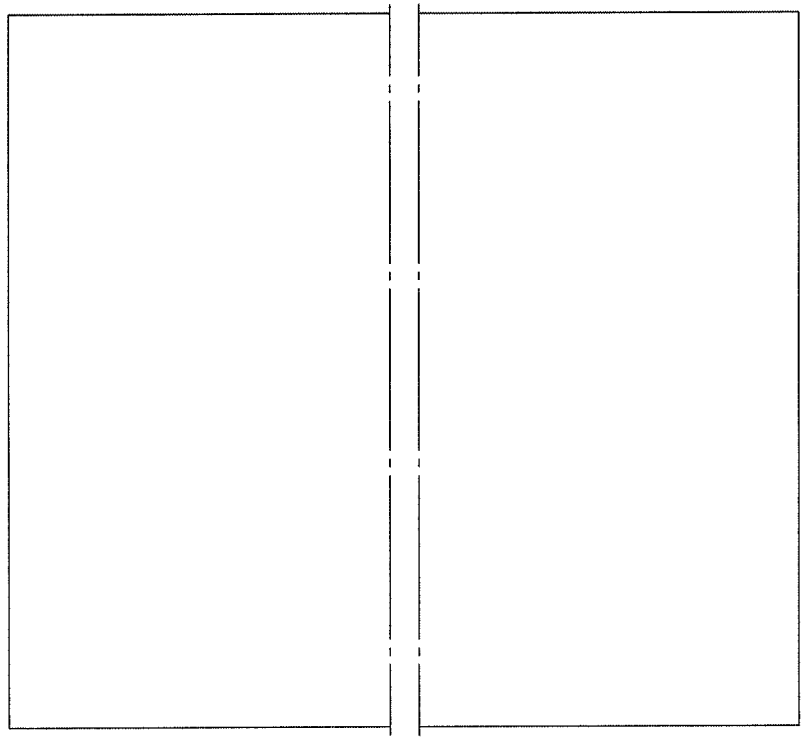
[FIG. 13]
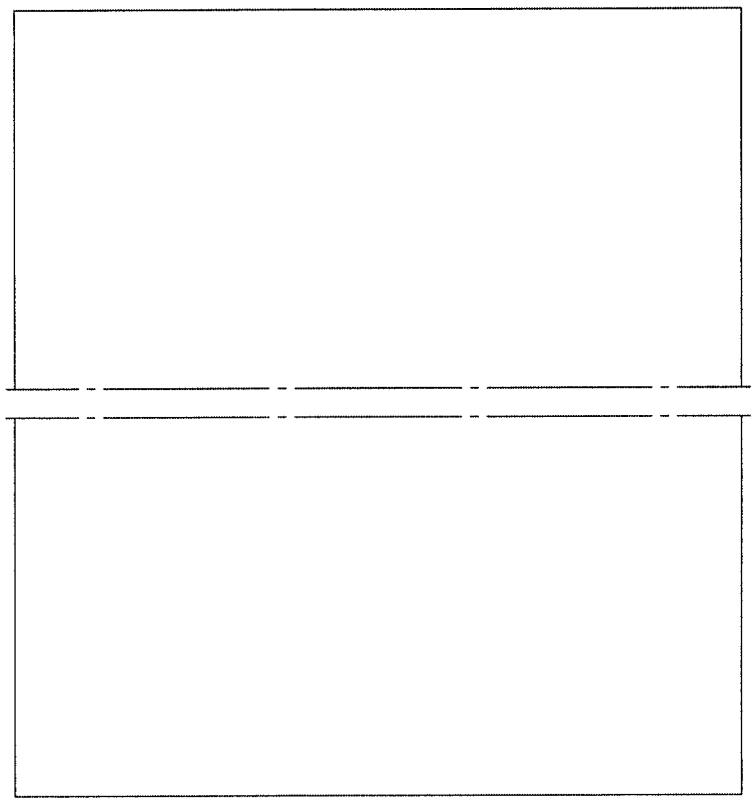

[FIG. 14]
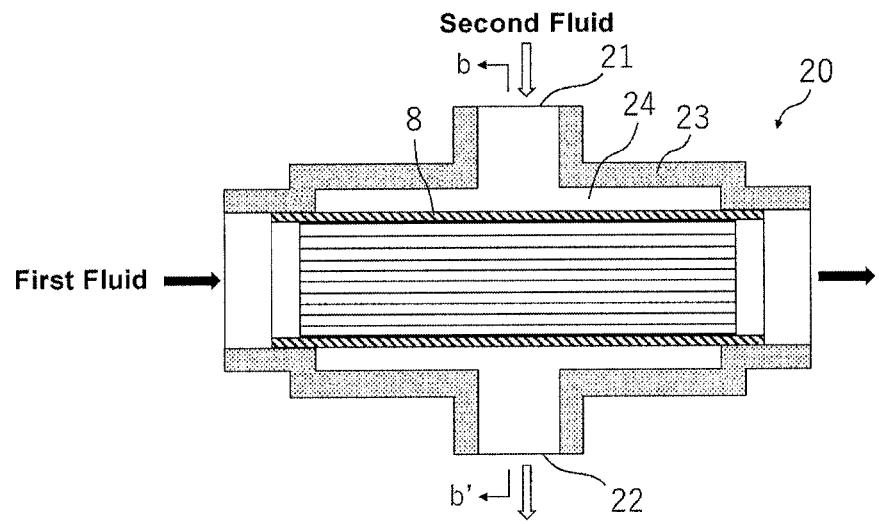
[FIG. 15]
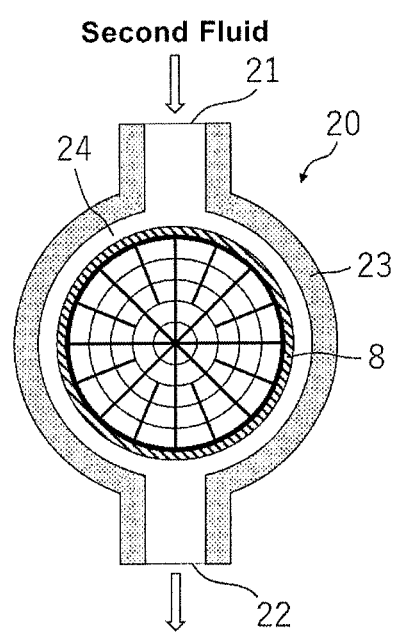

[FIG. 16]
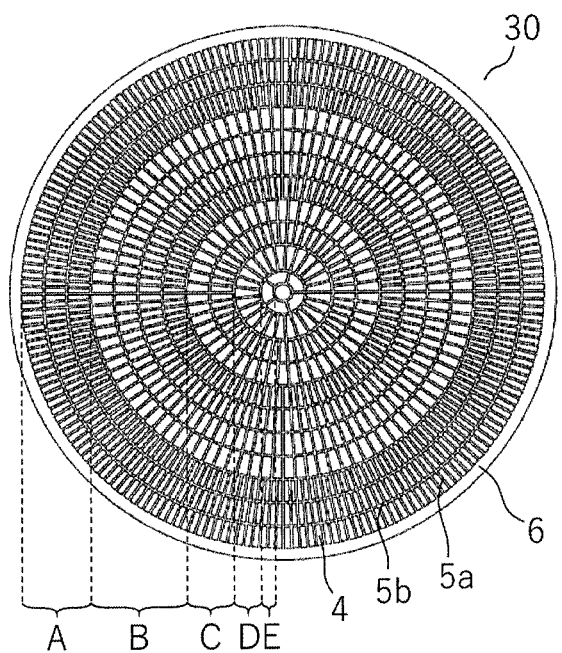
[FIG. 17]
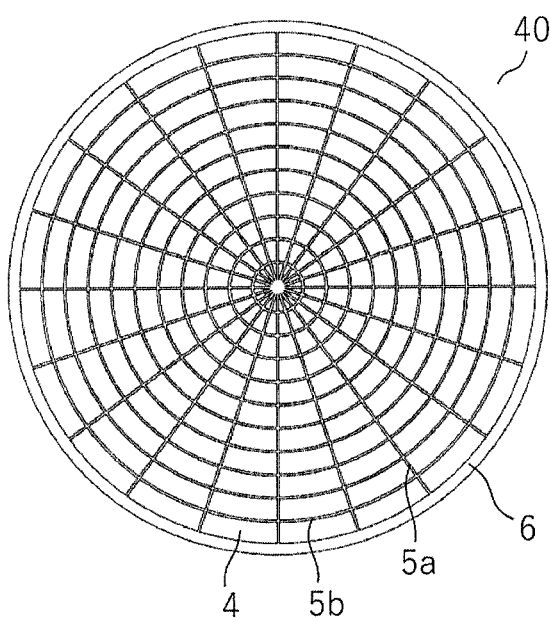

HEAT EXCHANGING MEMBER AND HEAT EXCHANGER

TECHNICAL FIELD

The present invention relates to a heat exchanging member and a heat exchanger. More particularly, the present invention relates to a heat exchanging member for transmitting heat of a first fluid (on a high temperature side) to a second fluid (a low temperature side), and to a heat exchanger including the heat exchanging member.

BACKGROUND ART

Recently, there is a need for improvement of fuel economy of motor vehicles. In particular, a system is expected that warms up a coolant, engine oil and ATF (Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

In such systems, for example, the use of a heat exchanger is considered. The heat exchanger is an apparatus including a heat exchanging member for conducting heat exchange between a first fluid and a second fluid by allowing the first fluid to flow inside and the second fluid to flow outside. In such a heat exchanger, for example, the heat can be effectively utilized by exchanging the heat from the first fluid having a high temperature (for example, an exhaust gas) to the second fluid having a low temperature (for example, cooling water).

As a heat exchanger for recovering heat from a gas with elevated temperature such as a motor vehicle exhaust gas, a heat exchanger having a heat exchanging member made of a refractory metal has been known. However, there have been problems that the refractory metal is expensive and further difficult to be processed, has high density and heavy weight, and has lower thermal conductivity, and the like. In view of the problems, recently, a heat exchanger is being developed that houses a heat exchanging member having a pillar shape honeycomb structure in a casing, and allows a first fluid to flow through cells of the honeycomb structure, and a second fluid to flow on an outer peripheral surface of the heat exchanging member in the casing.

As a honeycomb structure used for the heat exchanging member, prior art proposes a pillar shape honeycomb structure including: first partition walls each extending in a radial direction from a central portion toward an outer peripheral portion; and second partition walls each extending in a circumferential direction, in a cross section perpendicular to a flow direction of a first fluid (a cell extending direction) (patent document 1).

CITATION LIST

Patent Literature

Patent Document 1: Japanese Patent No. 6075381 B2

SUMMARY OF INVENTION

Technical Problem

However, in the pillar shape honeycomb structure as described in Patent Document 1, it is difficult to form cells, because a space between adjacent first partition walls becomes narrower toward the side of the center portion. In particular, to increase thermal conductivity (i.e., a heat recovery efficiency) in the radial direction of the pillar shape honeycomb structure, an increased number of the first partition walls extending in the radial direction is desirable. However, as the number of the first partition walls is increased, it will be more difficult to form the cells on the side of the central portion. If the cells are not formed on the side of the central portion or the cross sectional areas of the cells formed on the side of the center portion are too small, there is an issue that a pressure loss of the heat exchanging member is increased.

In response to the above issue, it is an object of the present invention to provide a heat exchanging member and a heat exchanger which can suppress an increase in a pressure loss while improving a heat recovery efficiency.

Solution to Problem

As a result of extensive research to solve the above issue, the present inventors have found that by decreasing the number of the first partition walls on the side of the central portion as compared with the number of the first partition walls on the side of the outer peripheral wall, the cells can be easily formed even on the central portion side of the honeycomb structure, achieving both improvement of a heat recovery efficiency and suppression of an increase in a pressure loss, and they have completed the present invention.

Thus, the present invention relates to a heat exchanging member comprising: a pillar shape honeycomb structure having an outer peripheral wall and partition walls extending through the pillar shape honeycomb structure from a first end face to a second end face to define a plurality of cells forming a through channel of a first fluid, and a covering member for covering the outer peripheral wall of the pillar shape honeycomb structure, wherein in a cross section of the pillar shape honeycomb structure perpendicular to a flow direction of the first fluid, the partition walls comprise: a plurality of first partition walls extending in a radial direction from the side of a center portion of the cross section; and a plurality of second partition walls extending in a circumferential direction, and a number of the first partition walls on the side of the central portion is less than a number of the first partition walls on the side of the outer peripheral wall.

The present invention also relates to a heat exchanger comprising the heat exchanging member.

Advantageous Effects of Invention

According to the present invention, it is possible to provide a heat exchanging member and a heat exchanger which can suppress an increase in a pressure loss while improving a heat recovery efficiency.

BRIEF DESCRIPTION OF DRAWINGS

FIG. 1 is a cross-sectional view of a pillar shape honeycomb structure in a direction parallel to a flow path direction of a first fluid in a heat exchanging member according to a first embodiment.

FIG. 2 is a cross-sectional view of a pillar shape honeycomb structure in a direction perpendicular to a flow direction of a first fluid (a cross-sectional view taken along the line a-a' in FIG. 1), in a heat exchanging member according to a first embodiment.

FIG. 3 is a cross-sectional view of a pillar shape honeycomb structure in a direction perpendicular to a flow direction of a first fluid in a heat exchanging member according to a second embodiment.

FIG. 4 is a specific example (front view) of a heat exchanging member according to a first or second embodiment.

FIG. 5 is a specific example (front view) of a heat exchanging member according to a first or second embodiment.

FIG. 6 is a specific example (front view) of a heat exchanging member according to a first or second embodiment.

FIG. 7 is a specific example (front view) of a heat exchanging member according to a first or second embodiment.

FIG. 8 is a specific example (front view) of a heat exchanging member according to a first or second embodiment.

FIG. 9 is a specific example (front view) of a heat exchanging member according to a first or second embodiment.

FIG. 10 is a specific example (front view) of a heat exchanging member according to a first or second embodiment.

FIG. 11 is a specific example (front view) of a heat exchanging member according to a first or second embodiment.

FIG. 12 is a left side view of the heat exchanging member in FIGS. 4 to 11.

FIG. 13 is a plan view of the heat exchanging member in FIGS. 4 to 11.

FIG. 14 is a cross-sectional view of a pillar shape honeycomb structure in a direction parallel to a flow path direction of a first fluid in a heat exchanger according to an embodiment.

FIG. 15 is a cross-sectional view (a cross-sectional view taken along the line b-b' in FIG. 14) in a direction perpendicular to a flow direction of a first fluid of a pillar shape honeycomb structure in a heat exchanger according to an embodiment.

FIG. 16 is a cross-sectional view of a pillar shape honeycomb structure of Example 1 in a direction perpendicular to a flow direction of a first fluid.

FIG. 17 is a cross-sectional view of a pillar shape honeycomb structure of Comparative Example 2 in a direction perpendicular to a flow direction of a first fluid.

DESCRIPTION OF THE PREFERRED EMBODIMENTS

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

<Heat Exchanging Member>

Embodiment 1

FIG. 1 shows a cross-sectional view of a pillar shape honeycomb structure in a direction parallel to a flow path direction of a first fluid (a cell extending direction), for a heat exchanging member according to a first embodiment of the present invention. FIG. 2 shows a cross-sectional view taken along the line a-a' in FIG. 1, which illustrates a cross-sectional view of the pillar shape honeycomb structure in a direction perpendicular to the flow direction of the first fluid, for the heat exchanging member according to the first embodiment of the present invention.

A heat exchanging member 1 includes: a pillar shape honeycomb structure 7 having an outer peripheral wall 6 and partition walls 5 extending through the pillar shape honeycomb structure 7 from a first end face 2 to a second end face 3 to define a plurality of cells 4 forming a through channel of a first fluid; and a covering member 8 for covering the outer peripheral wall 6 of the pillar shape honeycomb structure 7. In the heat exchanging member 1, the first flows through the plurality of cells 4 of the pillar shape honeycomb structure 7, a second fluid flows through an outer side of the covering member 8, heat exchange between the first fluid and the second fluid is performed via the outer peripheral wall 6 of the pillar shape honeycomb structure 7 and the covering member 8. It should be noted that in FIG. 1, the first fluid can flow in both right and left directions on a page surface of FIG. 1. The first fluid is not particularly limited, and various liquids or gases may be used. For example, when the heat exchanging member 1 is used for a heat exchanger mounted on a motor vehicle, the first fluid is preferably an exhaust gas.

A shape of the pillar shape honeycomb structure 7 is not particularly limited as long as it can allow the first fluid to flow through the cells 4 from the first end face 2 to the second end face 3. Examples of the shape of the pillar shape honeycomb structure 7 include a cylindrical shape, an elliptic cylindrical shape, a square prism shape or other polygonal columnar shapes. Thus, in the cross section perpendicular to the flow direction of the first fluid, the outer shape of the pillar shape honeycomb structure 7 may be circular, elliptical, square or other polygonal. In the first embodiment, the pillar shape honeycomb structure 7 is in the form of cylinder and has a circular across-sectional shape.

In a cross section of the pillar shape honeycomb structure 7 perpendicular to the flow direction of the first fluid (i.e., in the cross section shown in FIG. 2), partition walls 5 forming the pillar shape honeycomb structure 7 include a plurality of first partition walls 5a extending in the radial direction from the side of a center portion of the cross section and a plurality of second partition walls 5b extending in the circumferential direction. With such an arrangement, the heat of the first fluid can be transmitted in the radial direction via the first partition walls 5a, so that the heat can be efficiently transmitted to the outside of the pillar shape honeycomb structure 7.

In the cross section shown in FIG. 2, a number of the partition walls 5a on the side of the central portion is less than a number of the first partition walls 5a on the side of the outer peripheral wall 6. With such a configuration, the number of the cells 4 radially arranged will be decreased toward the central portion, so that the cells 4 can be easily formed even on the side of the central portion of the pillar shape honeycomb structure 7. It is, therefore, possible to suppress an increase in a pressure loss of the heat exchanging member 1, which is caused by difficulty in forming the cells 4 on the side of the central portion of the pillar shape honeycomb structure 7.

Here, the number of the first partition walls 5a on the side of the central portion of the pillar shape honeycomb structure 7 means the total number of the first partition walls 5a forming a plurality of cells 4 in a region having a plurality of cells 4 aligned in the circumferential direction (hereinafter referred to as a "circumferential region"), which region is closest to the central portion of the pillar shape honeycomb structure 7 (that is, furthest from the outer peripheral wall 6). Further, the number of the first partition walls 5a on the side of the outer peripheral wall 6 of the pillar shape honeycomb structure 7 means the total number of the first partition walls 5a forming a plurality of cells 4 in the circumferential region which is farthest from the central portion of the pillar shape honeycomb structure 7 (that is, closest to the outer peripheral wall 6).

In the cross section shown in FIG. 2, the number of the first partition walls 5a on the side of the central portion of the pillar shape honeycomb structure 7 is preferably decreased from the side of the outer peripheral wall 6 toward the side of the central portion. A space between the adjacent first partition walls 5a becomes narrower toward the central portion, so that it will be difficult to form the cells 4. However, with such a configuration, the space between the adjacent first partition walls 5a can be maintained, so that the cells 4 can be easily formed. Thus, an increase in a pressure loss of the heat exchanging member 1 can be suppressed.

It should be noted that a frequency of a decrease in the number of the first partition walls 5a is not particularly limited, and it may be continuous or intermittent.

In the cross section shown in FIG. 2, the first partition walls 5a defining one cell 4 are preferably longer than the second partition walls 5b defining one cell 4. The first partition walls 5a contribute to thermal conductivity in the radiation direction. Therefore, with such an arrangement, the heat of the first fluid flowing through the cells 4 on the side of the central portion of the pillar shape honeycomb structure 7 can be efficiently transmitted to the outside of the pillar shape honeycomb structure 7.

Each of the first partition walls 5a preferably has a thickness greater than that of each of the second partition walls 5b. The thickness of each partition wall 5 correlates with the thermal conductivity. Therefore, such a configuration can lead to larger thermal conductivity of the first partition walls 5a than the thermal conductivity of the second partition walls 5b. As a result, the heat of the first fluid flowing through the cells 4 on the side of the central portion of the pillar shape honeycomb structure 7 can be effectively transmitted to the outside of the pillar shape honeycomb structure 7.

In addition, the thickness of the partition walls 5 (the first partition walls 5a and the second partition walls 5b) is not particularly limited, and it may be adjusted as needed depending on applications and the like. The thickness of the partition walls 5 may preferably be from 0.1 to 1 mm, and more preferably from 0.2 to 0.6 mm. The thickness of the partition walls 5 of 0.1 mm or more can provide the pillar shape honeycomb structure 7 with a sufficient mechanical strength. Further, the thickness of the partition walls 5 of 1 mm or less can prevent the pressure loss from being increased due to a decrease in an opening area and the reduction of the heat recovery efficiency due to a decrease in a contact area with the first fluid.

The partition walls 5 may preferably have a density of from 0.5 to 5 $g/cm^3$. The density of the partition wall 5 of 0.5 $g/cm^3$ or more can provide the partition walls 5 with a sufficient strength. Further, the density of the partition walls 5 of 5 $g/cm^3$ or less can allow weight reduction of the pillar shape honeycomb structure 7. The density within the above range can allow the pillar shape honeycomb structure 7 to be strengthened and can also provide an effect of improving the thermal conductivity. It should be noted that the density of the partition walls 5 is a value measured by the Archimedes method.

In the heat exchanging member 1, the outer peripheral wall 6 of the pillar shape honeycomb structure 7 is subjected to an external impact, a thermal stress due to a temperature difference between the first fluid and the second fluid, and the like. Therefore, in terms of ensuring resistance to these external forces, the thickness of the outer peripheral wall 6 is preferably increased as compared with the thickness of the partition walls 5 (the first partition walls 5a and the second partition walls 5b). With such a configuration, any breakage (for example, cracks, chinks, and the like) in the outer peripheral wall 6 due to external forces can be suppressed.

It is to understand that the thickness of the outer peripheral wall 6 is not particularly limited, and it may be adjusted as needed depending on applications and the like. For example, when the heat exchanging member 1 is used for a general heat exchanging application, the thickness of the outer peripheral wall 6 is preferably more than 0.3 mm and 10 mm or less, and more preferably from 0.5 mm to 5 mm, and even more preferably from 1 mm to 3 mm. Further, when the heat exchanging member 1 is used for heat storage, the thickness of the outer peripheral wall 6 is preferably set to 10 mm or more to increase a heat capacity of the outer peripheral wall 6.

The partition walls 5 and the outer peripheral wall 6 of the pillar shape honeycomb structure 7 are mainly based on ceramics. The phrase "mainly based on ceramics" means that a ratio of a mass of ceramics to the total mass of the partition walls 5 and the outer peripheral wall 6 is 50% by mass or more.

Each of the partition walls 5 and the outer peripheral wall 6 preferably has a porosity of 10% or less, and more preferably 5% or less, and even more preferably 3% or less. Further, the porosity of the partition walls 5 and the outer peripheral wall 6 may be 0%. The porosity of the partition walls 5 and the outer peripheral wall 6 of 10% or less can lead to improvement of thermal conductivity.

The partition walls 5 and the outer peripheral wall 6 preferably contain SiC (silicon carbide) having high thermal conductivity as a main component. The phrase "contain SiC (silicon carbide) as a main component" means that a ratio of a mass of SiC (silicon carbide) to the total mass of the partition walls 5 and the outer peripheral wall 6 is 50% by mass or more.

More particularly, the material of the pillar shape honeycomb structure 7 that can be used includes Si-impregnated SiC, (Si+Al) impregnated SiC, metal composite SiC, recrystallized SiC, $Si_3N_4$, SiC, and the like. Among them, Si-impregnated SiC and (Si+Al) impregnated SiC are preferably used because they can allow production at lower cost and have high thermal conductivity.

A cell density (that is, the number of cells 4 per unit area) in the cross section of FIG. 2 is not particularly limited, and it may be adjusted as needed depending on applications or the like, and preferably in a range of from 4 to 320 $cells/cm^2$. The cell density of 4 $cells/cm^2$ or more can sufficiently ensure the strength of the partition walls 5, hence the strength of the pillar shape honeycomb structure 7 itself and effective GSA (geometrical surface area). Further, the cell density of 320 $cells/cm^2$ or less can allow prevention of an increase in a pressure loss when the first fluid flows.

The pillar shape honeycomb structure 7 preferably has an isostatic strength of more than 5 MPa, and more preferably 10 MPa or more, and still more preferably 100 MPa or more. The isostatic strength of the pillar shape honeycomb structure 7 of more than 5 MPa can lead to the pillar shape honeycomb structure 7 having improved durability. The isostatic strength of the pillar shape honeycomb structure 7 can be measured according to the method for measuring isostatic fracture strength as defied in the JASO standard M505-87 which is a motor vehicle standard issued by Society of Automotive Engineers of Japan, Inc.

A diameter of the pillar shape honeycomb structure 7 in the cross section of FIG. 2 may preferably be from 20 to 200 mm, and more preferably from 30 to 100 mm. Such a diameter can allow improvement of heat recovery efficiency. When the shape of the pillar shape honeycomb structure 7 in the cross section of FIG. 2 is not circular, the diameter of the largest inscribed circle that is inscribed in the shape of the cross section of the pillar shape honeycomb structure 7 is defined as the diameter of the pillar shape honeycomb structure 7 in the cross section of FIG. 2.

A length of the pillar shape honeycomb structure 7 (a length in the flow path direction of the first fluid) is not particularly limited, and it may be adjusted as needed depending on applications and the like. For example, the length of the pillar shape honeycomb structure 7 may preferably be from 3 mm to 200 mm, and more preferably from 5 mm to 100 mm, and still more preferably from 10 mm to 50 mm.

The pillar shape honeycomb structure 7 preferably has a thermal conductivity of 50 W/(m·K) or more at 25° C., and more preferably from 100 to 300 W/(m·K), and even more preferably from 120 to 300 W/(m K). The thermal conductivity of the pillar shape honeycomb structure 7 in such a range can lead to an improved thermal conductivity and can allow the heat inside the pillar shape honeycomb structure 7 to be efficiently transmitted to the outside. It should be noted that the value of thermal conductivity is a value measured according to the laser flash method (JIS R 1611-1997).

In the case where an exhaust gas as the first fluid flows through the cells 4 in the pillar shape honeycomb structure 7, a catalyst is preferably supported on the partition walls 5 of the pillar shape honeycomb structure 7. The supporting of the catalyst on the partition walls 5 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+ support) may preferably be from 10 to 400 g/L. Further, in the case of a catalyst containing a noble metal(s), the supported amount may preferably be from 0.1 to 5 g/L. The supported amount of the catalyst (catalyst metal+ support) of 10 g/L or more can easily achieve catalysis. On the other hand, the supported amount of 400 g/L or less can allow suppression of both an increase in a pressure loss and an increase in a manufacturing cost. The support refers to a carrier on which a catalyst metal is supported. Preferable supports include those containing at least one selected from the group consisting of alumina, ceria and zirconia.

The covering member 8 is not particularly limited as long as it can cover the outer peripheral wall 6 of the pillar shape honeycomb structure 7. For example, it is possible to use a tubular member that is fitted into the outer peripheral wall 6 of the pillar shape honeycomb structure 7 to cover circumferentially the outer peripheral wall 6 of the pillar shape honeycomb structure 7.

As used herein, the "fitted" means that the pillar shape honeycomb structure 7 and the covering member 8 are fixed in a state of being suited to each other. Therefore, the fitting of the pillar shape honeycomb structure 7 and the covering member 8 encompasses cases where the pillar shape honeycomb structure 7 and the covering member 8 are fixed to each other by a fixing method based on fitting such as clearance fitting, interference fitting and shrinkage fitting, as well as by brazing, welding, diffusion bonding, or the like.

The covering member 8 can have an inner surface shape corresponding to the outer peripheral wall 6 of the pillar shape honeycomb structure 7. Since the inner surface of the covering member 8 is in direct contact with the outer peripheral wall 6 of the pillar shape honeycomb structure 7, the thermal conductivity is improved and the heat in the pillar shape honeycomb structure 7 can be efficiently transferred to the covering member 8.

In terms of improvement of the heat recovery efficiency, a higher ratio of an area of a portion circumferentially covered with the covering member 8 in the outer peripheral wall 6 of the pillar shape honeycomb structure 7 to the total area of the outer peripheral wall 6 of the pillar shape honeycomb structure 7 is preferable. Specifically, the area ratio is preferably 80% or more, and more preferably 90% or more, and even more preferably 100% (that is, the entire outer peripheral wall 6 of the pillar shape honeycomb structure 7 is circumferentially covered with the covering member 8).

It should be noted that the term "outer peripheral wall 6" as used herein refers to a surface parallel to the flow direction of the first fluid of the pillar shape honeycomb structure 7, and does not include a surface (the first end face 2 and the second end face 3) perpendicular to the flow direction of the first fluid of the pillar shape honeycomb structure 7.

The covering member 8 is preferably made of a metal in terms of manufacturability. Further, the metallic covering member 8 is also preferable in that it can be easily welded to a metallic casing 23 that will be described below. Examples of the material of the covering member 8 that can be used include stainless steel, titanium alloys, copper alloys, aluminum alloys, brass and the like. Among them, the stainless steel is preferable because it has high durability and reliability and is inexpensive.

The covering member 8 preferably has a thickness of 0.1 mm or more, and more preferably 0.3 mm or more, and still more preferably 0.5 mm or more, for the reason of durability and reliability. The thickness of the covering member 8 is preferably 10 mm or less, and more preferably 5 mm or less, and still more preferably 3 mm or less, for the reason of reducing thermal resistance and improving thermal conductivity.

A length of the covering member 8 (a length in the flow path direction of the first fluid) is not particularly limited, and it may be adjusted as needed depending on the size of the pillar shape honeycomb structure 7 or the like. For example, the length of the covering member 8 is preferably larger than the length of the pillar shape honeycomb structure 7. Specifically, the length of the covering member 8 is preferably from 5 mm to 250 mm, and more preferably from 10 mm to 150 mm, and still more preferably from 20 mm to 100 mm.

It should be noted that when the length of the covering member 8 is larger than the length of the pillar shape honeycomb structure 7, the covering member 8 is preferably provided such that the honeycomb structure 7 is positioned at the central portion of the covering member 8.

Embodiment 2

FIG. 3 shows a cross-sectional view of the pillar shape honeycomb structure 7 in the direction perpendicular to the flow direction of the first fluid, for a heat exchanging member 10 according to a second embodiment of the present invention. It should be noted that components having the same reference numerals as those in the descriptions of the heat exchanging member 1 according to the first embodiment are the same as those of the heat exchanging member 1 according to the first embodiment, and descriptions of those components will be thus omitted.

In the heat exchanging member 10, a cell 4 partitioned and formed only from a second partition wall 5b is provided at the central portion, in the cross section (that is, the cross section of FIG. 3) of the pillar shape honeycomb structure 7, which is perpendicular to the flow direction of the first fluid. With such an arrangement, the cell 4 can be formed at the central portion even if the number of the first partition walls 5a is increased, so that an increase in a pressure loss of the heat exchanging member 10 can be stably suppressed.

Here, specific examples of the heat exchanging member 1, 10 according to the first or second embodiment of the present invention are shown in FIGS. 4 to 13. FIGS. 4 to 11 are front views of the heat exchanging member 1, 10, FIG. 12 is a left side view corresponding to the heat exchanging member 1, 10, and FIG. 13 is a plan view corresponding to the heat exchanging member 1, 10. It should be noted that a rear view is expressed in the same manner as the front view, a right side view is expressed in the same manner as the left side view, and a bottom view is expressed in the same manner as the plan view, and so those views will be omitted.

As shown in FIG. 11, the heat exchanging member 1, 10 according to the first or second embodiment of the present invention is preferably configured such that in an outer peripheral region having ⅔ of cells aligned from the outer peripheral wall 6 to the center portion, the total number of the cells 4 in the circumferential region satisfies the following relationship:

$$1 \geq N_A/N_B > \tfrac{1}{2}$$

wherein $N_A$ represents the total number of the cells 4 in the circumferential region on the side of the central portion adjacent to the cells 4 in $N_B$ and $N_B$ represents the total number of the cells 4 in the circumferential region on the side of the outer peripheral wall 6 adjacent to the cells 4 in $N_A$. $N_A/N_B$ is preferably ¾ or more. With such an arrangement, the sectional area of each cell 4 can be easily controlled to the same extent, so that an increase in a pressure loss of the heat exchanging member 1, 10 can be stably suppressed.

<Heat Exchanger>

The heat exchanger according to the present invention includes the heat exchanging member 1, 10 as described above. A member(s) other than the heat exchanging member 1, 10 is/are not particularly limited, and a known member(s) may be used. For example, the heat exchanger according to the present invention may include a casing that can form a flow path for a second fluid between the casing and the covering member 8 of the heat exchanging member 1, 10.

FIG. 14 shows a cross-sectional view of the pillar shape honeycomb structure 7 in the direction parallel to the flow path direction of the first fluid, for the heat exchanger according to an embodiment of the present invention. FIG. 15 is a cross-sectional view taken along the line b-b' in FIG. 14, which illustrates a cross-sectional view of the pillar shape honeycomb structure 7 in the direction perpendicular to the flow direction of the first fluid, for the heat exchanger according to an embodiment of the present invention.

The heat exchanger 20 includes the heat exchanging member 1; and a casing 23 having a second fluid inlet 21 and a second fluid outlet 22, the casing 23 circumferentially covering the covering member 8 of the heat exchanging member 1 such that a flow path 24 for second fluid is formed between the casing 23 and the covering member 8 of the heat exchanging member 1. It is preferable that the casing 23 circumferentially covers the entire heat exchanging member 1.

In the heat exchanger 20, an inner surface of the casing 23 is fitted into the outer peripheral surface of the covering member 8 of the heat exchanging member 1. In this case, the heat exchanger 20 preferably has a structure in which the outer peripheral surface of the covering member 8 at both end portions in the flow path direction of the first fluid is circumferentially brought into close contact with the inner surface of the casing 23, in order to prevent the second fluid from leaking to the outside. A method for bringing the outer peripheral surface of the covering member 8 into close contact with the inner surface of the casing 23 includes, but not limited to, welding, diffusion bonding, brazing, mechanical fastening, and the like. Among them, the welding is preferable because it has higher durability and reliability and can improve structural strength.

The casing 23 is preferably made of a metal in terms of thermal conductivity and manufacturability. Examples of the metal that can be used include stainless steel, titanium alloys, copper alloys, aluminum alloys, brass, and the like. Among them, the stainless steel is preferable because it is inexpensive and has high durability and reliability.

The casing 23 preferably has a thickness of 0.1 mm or more, and more preferably 0.5 mm or more, and still more preferably 1 mm or more, for the reasons of durability and reliability. The thickness of the casing 23 is preferably 10 mm or less, and more preferably 5 mm or less, and still more preferably 3 mm or less, in terms of cost, volume, weight and the like.

The casing 23 may be an integrally formed product, but it may preferably be a joined member formed of two or more members. In the case where the casing 23 is the joined member formed of two or more members, freedom in design for the casing 23 can be improved.

In the heat exchanger 20, the second fluid flows into the casing 23 from the second fluid inlet 21. Then, while passing through the flow path 24 for the second fluid, the second fluid undergoes heat exchange with the first fluid flowing through the cells 4 of the pillar shape honeycomb structure 7 via the covering member 8 of the heat exchanging member 1, and then flows out from the second fluid outlet 22. It should be noted that the outer peripheral surface of the covering member 8 of the heat exchanging member 1 may be covered with a member for adjusting a heat transfer efficiency.

The second fluid is not particularly limited, but the second fluid is preferably water or an antifreezing solution (LLC defined in JIS K 2234: 2006) when the heat exchanger 20 is mounted on a motor vehicle. For the temperatures of the first fluid and the second fluid, the temperature of the first fluid is preferably higher than the temperature of the second fluid, because under the temperature condition, the covering member 8 of the heat exchanging member 1 does not expand at the lower temperature and the pillar shape honeycomb structure 7 expands at the higher temperature, so that the fitted two members is difficult to be loosened. In particular, when the fitting of the pillar shape honeycomb structure 7 and the covering member 8 is shrinkage fitting, the above temperature condition can minimize a risk that the fitted members are loosened and the pillar shape honeycomb structure 7 is fallen out.

In the heat exchanger 20, the second fluid inlet 21 is provided on the opposite side of the second fluid outlet 22 across the heat exchanging member 1. However, there is no limitation for the positions of the second fluid inlet 21 and the second fluid outlet 22, and the positions may be changed as needed to the axial direction and the outer circumferential direction, in view of the installation position of the heat exchanger 20, the piping position, and the heat exchange efficiency.

In the above descriptions, the heat exchanger 20 using the heat exchanging member 1 has been described. However, needless to say, the heat exchanging member 10 may be used in place of the heat exchanging member 1.

<Methods for Producing Heat Exchanging Member and Heat Exchanger>

Next, methods for producing the heat exchanging member and the heat exchanger according to the present invention will be described for the case of the heat exchanging member 1 according to the first embodiment as an example. However, the methods for producing the heat exchanging member and the heat exchanger according to the present invention are not limited to those described below.

First, a green body containing ceramic powder is extrusion-molded into a desired shape to prepare a honeycomb formed body. At this time, the shape and density of the cells 4, the number, length and thickness of the partition walls 5, the shape and the thickness of the outer peripheral wall 6, and the like, can be controlled by selecting dies and jig in appropriate forms. The material of the honeycomb formed body that can be used includes the ceramics as described above. For example, when producing a honeycomb formed body mainly based on a Si-impregnated SiC composite, a binder and water or an organic solvent are added to a predetermined amount of SiC powder, and the resulting mixture is kneaded to form a green body, which is formed into a honeycomb formed body having a desired shape. The resulting honeycomb formed body can be then dried, and the honeycomb formed body can be impregnated with metallic Si and fired under reduced pressure in an inert gas or vacuum to obtain a pillar shape honeycomb structure 7 having cells 4 defined by partition walls 5.

The pillar shape honeycomb structure 7 is then inserted into the covering member 8, whereby the outer peripheral surface of the pillar shape honeycomb structure 7 is circumferentially covered with the covering member 8. By shrinkage-fitting them in this state, the inner peripheral surface of the covering member 8 is fitted into the outer peripheral surface of the pillar shape honeycomb structure 7. As described above, the fitting of the pillar shape honeycomb structure 7 and the covering member 8 can be performed by, in addition to the shrinkage fitting, a fixing method based on fitting such as clearance fitting and interference fitting, or by brazing, welding, diffusion bonding or the like. Thus, the heat exchanging member 1 is completed.

Both end portions of the cover member 8 of the heat exchanging member 1 are joined to the inner surface of the casing 23. As described above, there are various methods including fitting. If necessary, the joining portions can be joined by welding or the like. Thus, the casing 23 that circumferentially covers the outer peripheral surface of the cover member 8 is formed, and the flow path 24 for the second fluid is formed between the outer peripheral surface of the covering member 8 and the inner surface of the casing 23. The heat exchanger 20 is thus completed.

It is to understand that while in the above descriptions, the case of using the heat exchanging member 1 has been described, the heat exchanging member 10 can be, of course, used in place of the heat exchanging member 1.

EXAMPLES

Hereinafter, the present invention will be described more specifically with reference to Examples, but the present invention is not limited to these Examples.

<Production of Honeycomb Structure>

Example 1

A green body containing SiC powder was extrusion-molded into a desired shape, dried, processed to have predetermined external dimensions, and impregnated with Si and fired to produce a pillar shape honeycomb structure 30. The pillar shape honeycomb structure 30 had a cylindrical shape, a diameter (outer diameter) of 70 mm, and a length in the flow path direction of the first fluid of 40 mm. FIG. 16 shows a cross-sectional view of the pillar shape honeycomb structure 30 in the direction perpendicular to the flow path direction of the first fluid. The pillar shape honeycomb structure 30 had a cell 4 defined only by a second partition wall 5b at the central portion, and had less number of the first partition walls 5a on the side of the central portion than the number of the first partition walls 5a on the side of the peripheral wall 6, such that the number of cells 4 was 200 in a circumferential region A, 100 in a circumferential region B, and 50 in a circumferential region C, 25 in a circumferential region D and 5 in a circumferential region E. Further, the pillar shape honeycomb structure 30 had a thickness of the first partition wall 5a of 0.3 mm, a thickness of the second partition wall 5b of 0.25 mm, and a thickness of the outer peripheral wall 6 of 1.5 mm.

Such a shape as described above could allow the cells 4 to be also formed on the central portion side of the pillar shape honeycomb structure 30.

Comparative Example 1

An attempt was made to produce a pillar shape honeycomb structure in the same method as that of Example 1, with the exception that the number of cells 4 was set to 200 in all the circumferential regions without decreasing the number of first partition walls 5a on the side of the central portion. However, it could not be molded and could not produce the pillar shape honeycomb structure.

Comparative Example 2

A pillar shape honeycomb structure 40 was produced in the same method as that of Example 1, with the exception that the number of cells 4 was set to 20 in all the circumferential regions without decreasing the number of first partition walls 5a on the side of the central portion. FIG. 17 shows a cross-sectional view of the pillar shape honeycomb structure 40 in the direction perpendicular to the direction of the flow path of the first fluid. The pillar shape honeycomb structure 40 had a thickness of the first partition wall 5a of 0.3 mm, a thickness of the second partition wall 5b of 0.25 mm, and a thickness of the outer peripheral wall 6 of 1.5 mm.

Although the shape as described above could allow production of the pillar shape honeycomb structure 40, no cell 4 could be formed at the center portion.

<Production of Heat Exchanging Member and Heat Exchanger>

Heat exchanging members and heat exchangers were produced using the pillar shape honeycomb structure 30 of Example 1 and the pillar shape honeycomb structure 40 of Comparative Example 2.

First, using a tubular member made of stainless steel as a covering member 8, each of the pillar shape honeycomb structures 30, 40 was inserted to an inner center of the tubular member, and an inner peripheral surface of the tubular member was then fitted into each of the honeycomb structures 30, 40, to produce a heat exchanging member having the structure shown in FIG. 1.

For the heat exchangers, each heat exchanging member was disposed in a casing 23, and both end portions of the cover member 8 of each heat exchanging member was joined to an inner surface of the casing 23, to produce heat exchangers each having the structures shown in FIGS. 14 and 15.

<Heat Exchanging Test>

The heat exchangers thus produced were subjected to a heat exchanging test by the following method. Air (the first fluid) having a temperature (Tg1) of 400° C. flowed through each of the honeycomb structures 30, 40 at a flow rate (Mg) of 10 g/s. On the other hand, cooling water (the second fluid) at 40° C. was supplied from the second fluid inlet 21 at a flow rate (Mw) of 10 L/min, and the cooling water after heat exchange was recovered from the second fluid outlet 22.

Immediately after passing air and cooling water through each heat exchanger for 5 minutes from the start of supply under the above conditions, a temperature (Tw1) of the cooling water at the second fluid inlet 21 and a temperature (Tw2) of the cooling water at the second fluid outlet 22 were measured to obtain a heat recovery efficiency.

Here, a heat quantity Q recovered by the cooling water is expressed by the following equation:

$Q$ (kW)$=\Delta Tw \times Cpw \times Mw$, with:

$\Delta Tw = Tw2 - Tw1$, and $Cpw$(specific heat of water) $=4182$ J/(kg·K).

Also, the heat recovery efficiency η of the heat exchanger is expressed by the following equation:

$\eta$ (%)$=Q/\{(Tg1-Tw1) \times Cpg \times Mg\} \times 100$, with:

$Cpg$(specific heat of air)$=1050$ J/(kg·K).

<Pressure Loss Test>

In the above heat exchanging test, pressure gauges were disposed in the flow path for air located in front of and behind each heat exchanging member, respectively. The pressure loss of the air flowing through each heat exchanging member (through the cells 4) was measured from a differential pressure obtained from the measurement values for those pressure gauges.

<Isostatic Strength Test>

A urethane rubber sheet having a thickness of 0.5 mm was wound around the outer peripheral surface of each of the pillar shape honeycomb structures 30, 40, and aluminum disks each having a thickness of 20 mm were further disposed on both end portions of each of the pillar shape honeycomb structures 30, 40 while interposing circular urethane rubber sheets between both end portions and the aluminum disks. The aluminum disks and urethane rubber sheets used had the same shape and the same size as those of the end portions of each of the pillar shape honeycomb structures 30, 40. Further, a vinyl tape was wound along the outer periphery of each aluminum disk, whereby a space between the outer periphery of each aluminum disk and each urethane rubber sheet was sealed to obtain a test sample. The test sample was then placed in a pressure vessel filled with water. A water pressure in the pressure vessel was increased to 200 MPa at a rate of from 0.3 to 3.0 MPa/min, and the water pressure at the time when each of the pillar shape honeycomb structures 30, 40 was broken was measured. In the evaluation results, a case where breakage did not occur even at a water pressure of 200 MPa is expressed as "≥200 (MPa)".

The results of the respective tests as described above are shown in Table 1.

TABLE 1

| | Heat Recovery Efficiency (%) | Pressure Loss (Pa) | Isostatic Strength (Mpa) |
|---|---|---|---|
| Example 1 | 65 | 100 | ≥200 |
| Comparative Example 2 | 30 | 70 | 5 |

As shown in Table 1, in Example 1, the pressure loss was less, the heat recovery efficiency was higher, and the isostatic strength was also higher.

However, in Comparative Example 2, although the pressure loss was small because the cells 4 were large, the heat recovery efficiency was lower and the isostatic strength was also lower.

As can be seen from the above results, the present invention can provide a heat exchanging member and a heat exchanger that can suppress an increase in a pressure loss while improving a heat recovery efficiency.

DESCRIPTION OF REFERENCE NUMERALS 1, 10 heat exchanging member
2 first end face
3 second end face
4 cell
5 partition wall
5a first partition wall
5b second partition wall
6 outer peripheral wall
7, 30, 40 pillar shape honeycomb structure
8 covering member
20 heat exchanger
21 second fluid inlet
22 second fluid outlet
23 casing
24 flow path for second fluid

What is claimed is:
1. A heat exchanging member comprising:
a pillar shape honeycomb structure having:
an outer peripheral wall; and
partition walls extending through the pillar shape honeycomb structure from a first end face to a second end face to define a plurality of cells forming a through channel of a first fluid; and a covering member for covering the outer peripheral wall of the pillar shape honeycomb structure such that an inner surface of the covering member is in direct contact with the outer peripheral wall of the pillar shape honeycomb structure, wherein heat exchange between the first fluid and a second fluid flowing through an outer side of the covering member is performed via the outer peripheral wall and the covering member, wherein the first fluid is gas, and the second fluid is liquid, and wherein in a cross section of the pillar shape honeycomb structure perpendicular to a flow direction of the first fluid, the partition walls comprise:

a plurality of first partition walls extending in a radial direction from the side of a center portion of the cross section; and a plurality of second partition walls extending in a circumferential direction, a number of the first partition walls on the side of the central portion is less than a number of the first partition walls on the side of the outer peripheral wall, and in all of the plurality of cells, the first partition walls defining one cell are longer than the second partition walls defining the one cell in the cross section of the pillar shape honeycomb structure perpendicular to the flow direction of the first fluid.

2. The heat exchange member according to claim 1, wherein the first fluid flows through the plurality of cells of the pillar shape honeycomb structure, the second fluid flows through the outer side of the covering member, and the heat exchanging member is configured to enable heat exchange between the first fluid and the second fluid, via the outer peripheral wall of the pillar shape honeycomb and the covering member.

3. The heat exchanging member according to claim 1, wherein the number of the first partition walls is decreased from the side of the outer peripheral wall toward the side of the central portion, in the cross section of the pillar shape honeycomb structure perpendicular to the flow direction of the first fluid.

4. The heat exchanging member according to claim 1, wherein the outer peripheral wall has a thickness larger than that of the partition walls.

5. The heat exchanging member according to claim 1, wherein the pillar shape honeycomb structure has a cell defined only by the second partition walls at the central portion, in the cross section of the pillar shape honeycomb structure perpendicular to the flow path direction of the first fluid.

6. The heat exchanging member according to claim 1, wherein the first partition walls have a thickness larger than that of the second partition walls.

7. The heat exchanging member according to claim 1, wherein in an outer peripheral region having ⅔ of cells aligned from the outer peripheral wall to the center portion, the total number of the cells in the circumferential region satisfies the following relationship:

$$1 \geq N_A/N_B > 1/2$$

wherein NA represents the total number of the cells in the circumferential region on the side of the central portion adjacent to the cells in $N_B$ and $N_B$ represents the total number of the cells in the circumferential region on the side of the outer peripheral wall adjacent to the cells in $N_A$.

8. A heat exchanger comprising the heat exchanging member according to claim 1.

9. The heat exchanging member according to claim 1, wherein the covering member has a thickness of 0.5 mm to 3 mm.

* * * * *